Dec. 11, 1928 Re. 17,158
E. RUHMER
MULTIPLE TELEPHONY
Original Filed April 4, 1911
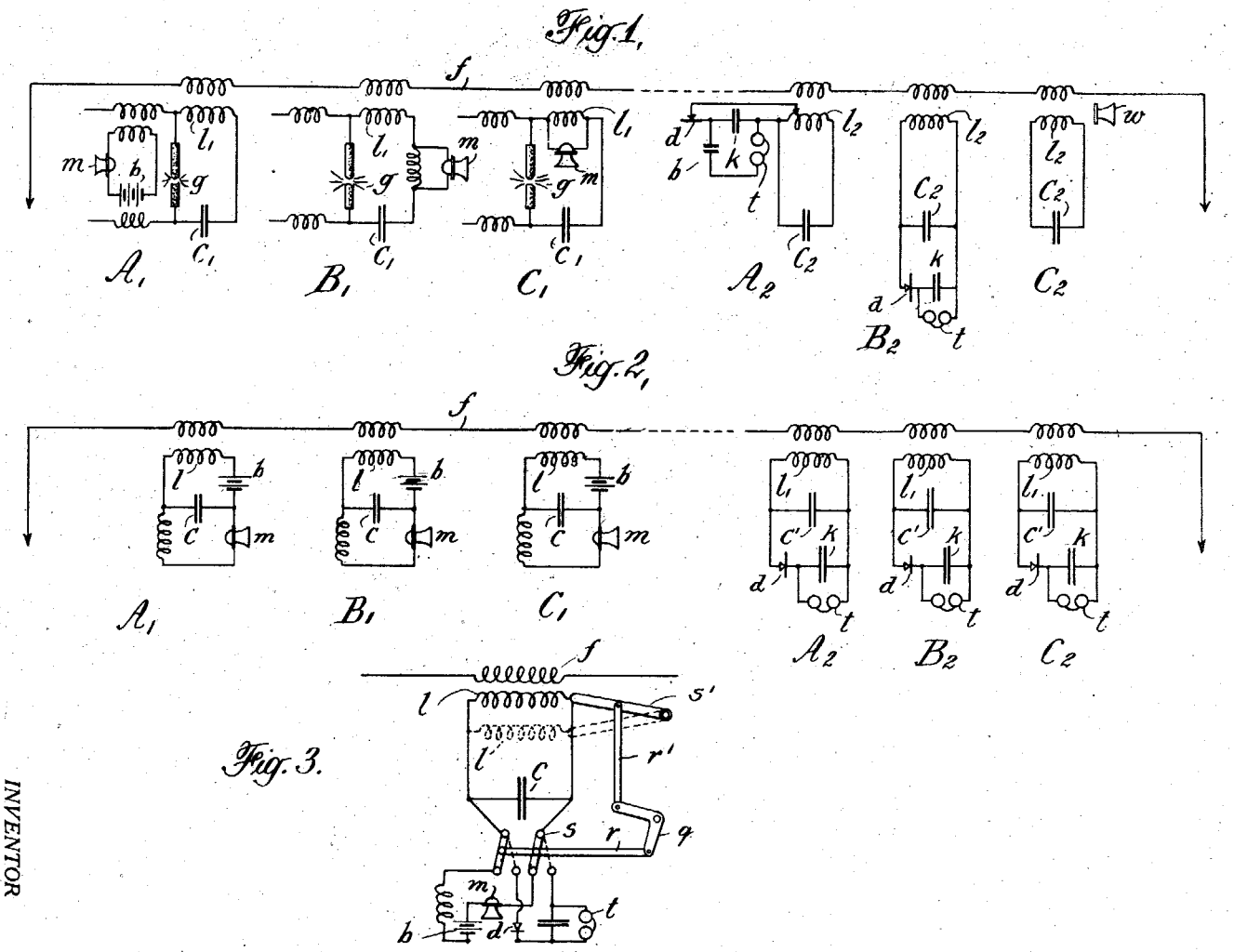
INVENTOR
Ernst Ruhmer, Deceased,
Edwin Gruhl, Assignee.
BY
John B. Brady
ATTORNEY Reissued Dec. 11, 1928. Re. 17,158

UNITED STATES PATENT OFFICE.

ERNST RUHMER, DECEASED, LATE OF BERLIN, GERMANY, BY EDWIN GRUHL, ASSIGNEE, OF NEW YORK, N. Y., ASSIGNOR TO WIRED RADIO, INC., OF NEW YORK, N. Y., A CORPORATION OF DELAWARE.

MULTIPLE TELEPHONY.

Original application filed April 4, 1911, Serial No. 618,871, and in France April 5, 1910. Renewed February 4, 1919, Serial No. 275,001. Original No. 1,356,222, dated October 19, 1920. Application for reissue filed February 21, 1925. Serial No. 10,983.

This invention relates to a method and means by which it is possible to transmit simultaneously several telephonic messages by one and the same transmission line.

For transmitting conversations, as in wireless telephony by means of electric waves, alternating currents of high frequency and of different frequencies are used which are superimposed on the line and are separated only at the receiving station, where they act on different oscillatory circuits tuned with the corresponding oscillatory transmission circuits communicating with the receiving apparatus.

In systems in accordance with this invention comparatively loose coupling is preferably used for connecting the transmission line to the different receiving circuits for the purpose of obtaining perfect separation of the several carrier frequencies, thereby avoiding interference between simultaneously transmitted messages or the reception of signals at stations for which they are not intended.

Prior to this invention it has been proposed to accomplish multiplex telephony by means of a plurality of high frequency carrier currents superimposed on a metallic transmission line, but in so far as it has been possible to ascertain, none of the previous attempts was successful because of the fact that no means were provided at the receiving stations for rectifying the high frequency carrier currents—a procedure which has been found to be absolutely essential to the practical operation of such systems.

The essence of the present invention, therefore, consists, first, in loosely coupling the receiving apparatus at the several stations to the common transmission line, and second, in providing at each receiving station suitable means for rectifying the received carrier frequencies whereby it is rendered possible to translate the modulated carrier current into audible signals.

A further feature of the invention consists in the provision of a novel device whereby the transmitting and receiving apparatus at each station may be alternately associated with the common transmission line and whereby the inductive coupling between the line and the transmitting and receiving apparatus may be automatically shifted simultaneously with the switching-over operation.

Several arrangements according to this invention are illustrated by way of example in the accompanying drawings, in which:

Fig. 1 is a diagrammatic view representing the transmitting and receiving stations with independent sources of high frequency currents at each transmission station;

Fig. 2 represents diagrammatically a modified form of the improved system;

Fig. 3 shows a combined sending and receiving station embodying the invention.

In Fig. 1, $A_1$, $B_1$, $C_1$ and $A_2$, $B_2$, $C_2$, are respectively the corresponding transmitting and receiving stations.

For producing high frequency currents a high frequency generator is provided at each transmitting station, as, for instance, an arc $g$ with oscillating circuit $c_1$ $l_1$ in parallel therewith. The different oscillatory circuits are adjusted to different frequencies by a proper choice of values of capacitance and inductance respectively for the condenser $c_1$ and inductance coils $l_1$.

The amplitude of the high frequency currents produced in these circuits is influenced by microphones $m$, which in some instances are shown in series with a battery $b$ and in other instances without any such battery, the requirement as to the battery depending upon the particular type of circuit employed, as will be readily observed from the drawings.

Modulation of the carrier currents may be effected directly or the supply current may be modulated before it reaches the arc; in either case the result is substantially the same.

A change in the coupling between the transmitting circuit and the line is equivalent to a change in amplitude of the high frequency current passing through the circuit.

Generally speaking, any modulating method can be used provided it can be so arranged that the microphones at one transmitting station cannot affect any of the carrier current other than that with which it is individually associated.

In the embodiments of the invention illustrated there are in each case an equal number of transmitting stations and receiving stations operatively associated with the same transmission line. Each transmitting station is arranged for communication with one only of the receiving stations.

In Fig. 1, $A_2$, $B_2$ and $C_2$ are receiving stations each including an oscillatory circuit $l_2$ $c_2$ tuned to the frequency of the corresponding transmitting stations $A_1$, $B_1$, $C_1$.

Each receiving station includes in addition to the oscillatory circuit $l_2$ $c_2$ a detector $d$, the function of which is to rectify the received signal currents as in wireless telephony employing electromagnetic waves, telephones $t$ and condenser $k$ shunted across the telephones. At station $C_2$ reception is effected by the telephone $w$, which is operated by means of Foucalt currents, no rectifying detector being employed. This latter arrangement while operable, is not entirely satisfactory, as the response is extremely weak, but is shown merely as illustrating an alternative possibility.

The coupling of the common transmission line to the transmitting circuits may be comparatively close, but on the contrary the coupling to the receiving circuits must be comparatively loose.

Fig. 2 shows a simplified installation which does not require special apparatus for producing high frequency currents.

By talking into the microphone $m$ there is produced in the oscillatory circuit comprising the capacity $c$ and inductance $l$ trains of damped waves corresponding to the sound waves acting on the microphone.

In general all that has been said with reference to Fig. 1 is also applicable with respect to Fig. 2.

Fig. 3 shows a further improvement. It relates to an arrangement by means of which it is possible to use the same oscillatory circuit at one time as a transmitter and another time as a receiver, so that it is possible to talk and listen alternately with one and the same apparatus. This result is obtained owing to a commutator or switch S, which switches into the oscillatory circuit either the microphone $m$ and the battery in series therewith or the detector $d$ and the telephone $t$. This switch can be designed so as to allow at the same time of a change of coupling of the self-induction coil $l$ with the line $f$ so that when talking there is produced a tighter coupling and when listening a looser coupling. This is effected by connecting switch S by means of rod $r$ with one arm of bell crank or bent lever $q$, and connecting the other arm of $q$ by means of rod $r'$ with pivoted arm $s'$ to which is attached coil $l$.

Having now particularly described and ascertained the nature of the said invention and in what manner the same is to be performed, it is declared that what is claimed is:

1. The combination with a conductor, of transmission means coupled thereto for impressing electric oscillations thereon, receiving means associated with said transmission means, and shifting means operative to place either said transmission means or said receiving means into operative relation to said conductor and to simultaneously modify the coupling between said conductor and said transmission means.

2. The combination with a conductor provided with a coil, of a coil inductively related to and movable with respect to said first mentioned coil, transmission means for impressing electric oscillations on said second mentioned coil, receiving means for receiving electric oscillations from said second mentioned coil, and means operative to connect either said transmission means or said receiving means operatively to said second mentioned coil and to vary the distance between said coils as a result of such connection.

3. The combination with a conductor provided with a coil, of a coil inductively related to and movable with respect to said first mentioned coil, transmission means including a microphone for impressing electric oscillations on said second mentioned coil, receiving means including a telephone and a detector for receiving electric oscillations from said second mentioned coil, and means operative to connect either said transmission means or said receiving means operatively to said second mentioned coil and to vary the distance between said coils as a result of such connection.

4. The combination with a conductor, of means spaced from but inductively connected to said conductor, transmission means for impressing electric oscillations on said first mentioned means, receiving means for receiving electric oscillations from said first mentioned means, and means operative to connect either said transmission means or said receiving means operatively to said first mentioned means and to simultaneously and automatically vary the distance between said conductor and said first mentioned means.

5. The combination with a conductor, of means spaced from but inductively connected to said conductor, transmission means for impressing electric oscillations on said first mentioned means, receiving means for receiving electric oscillations from said first mentioned means, and switching means operative to connect either said transmission means or said receiving means operatively to said first mentioned means and to simultaneously and automatically vary the distance between said conductor and said first mentioned means.

6. In a system of multiplex telephony, a plurality of stations having both transmitting and receiving apparatus, a common line circuit, means coupled to said line circuit for impressing electric oscillations of different frequencies upon said line circuit, means for modifying said electric oscillations by sound waves, local circuits at each station tuned to a particular frequency of said electric oscillations, and means for placing either the transmitting or the receiving apparatus in operative connection with the common line circuit, and for simultaneously changing the coupling between said local circuits and the common line circuit.

EDWIN GRUHL,
*Assignee of Ernst Ruhmer, Deceased.*